United States Patent Office 3,111,844
Patented Nov. 26, 1963

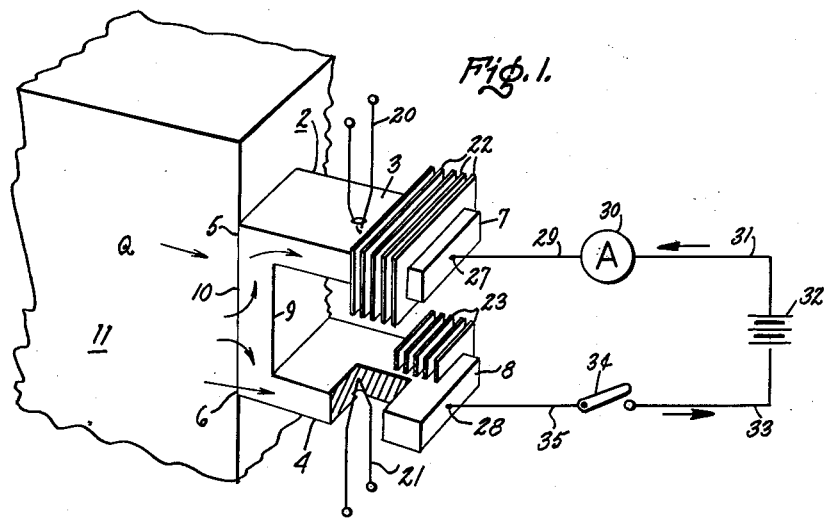
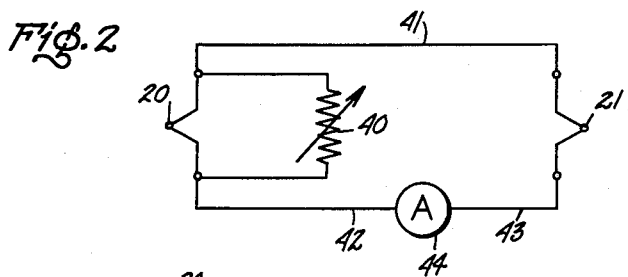
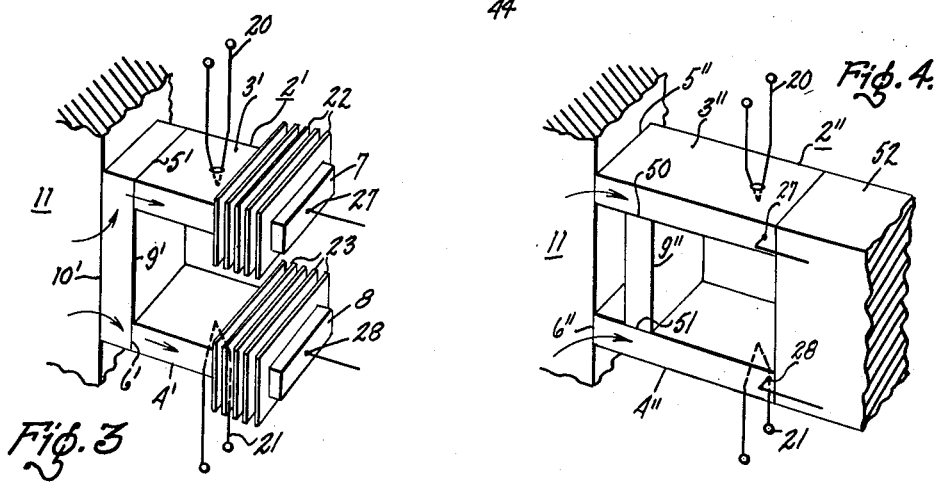

3,111,844
HEAT RATE MEASURING APPARATUS
Frank W. Luik, Jr., Schenectady, N.Y., assignor to
General Electric Company, a corporation of New York
Filed Dec. 23, 1959, Ser. No. 861,561
6 Claims. (Cl. 73—190)

The present invention relates to a heat measuring apparatus, and more particularly, to heat rate measuring apparatus utilizing the Thomson effect.

Heretofore, the usual method for detecting a heat rate or heat flow from a surface has been to measure the temperatures existing on each side of the surface and utilizing this information with the physical characteristics of the surface to calculate the heat rate or flow. Various devices are available to measure temperatures accurately, however, devices for detecting the heat rate directly are not commercially available. In recent years with the advance of certain technologies, such as those relating to rocket and missile engines and also in the study of critical heat-exchange surfaces, there has been a need for an instrument which will readily detect and directly indicate the heat rate from a surface.

The present invention envisions utilizing a detector element wherein the measurement of the Thomson effect will directly indicate the heat rate from the surface measured. According to the Thomson effect, if a temperature gradient exists in a conductor indicating heat flow, an electric potential gradient is also brought into existence.

The chief object of the present invention is to provide an improved heat rate measuring apparatus.

Another object of the invention is to provide an apparatus having a detector wherein the Thomson effect is directly utilized to indicate the heat rate from the surface to be measured.

These and other objects of my invention will be more readily apparent from the following description.

Briefly stated, the present invention includes first and second members fabricated of a material having a high Thomson coefficient, each of these members having a first end and a second end, the first end of each member being adapted to be placed adjacent a heat source to be measured, temperature sensing means being associated with each member, the second end of each of said members being connected to a source of unidirectional current, and means for connecting areas adjacent the first ends to complete an electrical circuit wherein in the first member the direction of heat flow and unidirectional current flow are in the same direction, and in the second member the direction of heat flow and the direction of current flow are opposite.

The attached drawings illustrate preferred embodiments of my invention, in which:

FIGURE 1 is a diagrammatic view of an apparatus for practicing the present invention;

FIGURE 2 is a schematic diagram of means associated with the temperature sensing means utilized in FIGURE 1 to permit direct reading of the heat rate;

FIGURE 3 is a perspective view of another embodiment of the detector shown in FIGURE 1, and FIGURE 4 is a third embodiment of the detector shown in FIGURE 1.

Basically, the present invention comprises a detector which is in heat-exchange relation with an object from which the heat flow is to be measured, means for passing a unidirectional current through the detector and a comparison circuit for converting the temperature measurements taken from the detector and including means having indicia to show the heat rate in suitable units per time, such as calories per second or B.t.u. per second.

In FIGURE 1, there is shown an apparatus for practicing the present invention. A detector 2 basically comprises an integral element having a general U shape with a surface 10 thereof placed in heat-exchange relation with an object 11, the heat emitted therefrom being the heat flow to be measured. Detector 2 includes a first member 3 and a second member 4, both members being substantially parallel and extending substantially perpendicularly from the surface of object 11. First member 3 includes a first end 5 and a second end 7. The first end terminates, in this embodiment substantially at the surface 10 which is in heat-exchange relation with the object 11 but electrically insulated therefrom. Second end 7 is the end being the furthest extremity from object 11. This end may be provided with suitable heat-exchange means such as the plate fins 22. End 7 also may be provided with suitable means at point 27 to permit the connection thereof to a suitable source of unidirectional current. Second member 4 similarly is provided with a first end 6 which substantially terminates at the surface 10. Second end 8 of the second member may also be provided with plate fins 23 similar to the previously mentioned plate fins 22 and also a point 28 to which a suitable connection may be made with the unidirectional current source. The first and second members may also be provided with suitable temperature sensing means 20 and 21 respectively; which may be located a suitable distance from first ends 5 and 6 of the first and second members respectively. The detector may be a unitary member which includes the first and second members and also a base member 9 which connects the areas adjacent first ends 5 and 6 of the first and second members to one another. This base portion 9 provides an electrically conductive path between the first and second members whereby current may be passed from the point 27 at end 7 through the detector to the point 28 on end 8 of the second member.

There may be also provided means to pass a suitable unidirectional current through detector 2. This may comprise a conductor 29 connected to point 27 on the first member of the detector. Conductor 29 is connected to ammeter 30 which in turn is connected by means of conductor 31 to the positive terminal of a suitable unidirectional current source. In the present embodiment the unidirectional source is illustrated as a battery 32. The negative terminal of battery 32 is connected by means of conductor 33 to switch 34. A conductor 35 connects the switch to point 28 on the second member thereby completing a circuit from the direct current source through the detector.

Generally speaking, the Thomson effect states that in certain heated elements heat is liberated at a point where current and heat flow in the same direction and heat is absorbed where current and heat flow in opposite directions. According to the electron theory this phenomenon is explained as follows:

In an unequally heated element, the concentration of electrons becomes greater at one end than at the other end. There results a flow of electrons from, let us say, the hot to the cold end of element. In consequence of this flow, the hot end is charged positively and the cold end charged negatively. This difference in the concentration of the electrons between the two ends of the element sets up an electric force which finally stops the further movement of electrons along the element. A state of equilibrium is reached in which the hot end of the element is at a higher potential than the cold end. When an external electromotive force is applied to drive electrons from the hot to the cold end, this electromotive force must overcome the electric field in the element due to the unequal concentration of electrons at the ends. Because of this fact, more work is necessary to send the current through the element than would be necessary if the concentration of the electrons were uniform throughout it. If on the other hand, a current is caused to flow through the element in the opposite direction, the heat generated by it is less than in the former case because the electric field in the element is now aiding the impressed electromotive force.

Considering the operation of detector 2, heat flowing from object 11 will pass through surface 10. Ordinarily, this surface is a good heat conducting path. However, it is desirable that slight oxide coating be present so as to suitably electrically insulate the detector from the object which is to be measured. This heat will pass through first ends 5 and 6 of first and second members 3 and 4 and pass in a direction from left to right toward the second ends of the first and second members.

In order to encourage the flow of heat through the first and second members, suitable cooling means may be provided at the extremities of the first and second members. While in the embodiment shown in FIGURE 1 cooling fins are provided, liquid coolant may be utilized or other suitable and conventional means may be used. It will be therefore appreciated that the heat passing through the first and second members will flow in parallel paths. With the switch 34 open and no current passing through the detector the temperature sensing means 20 and 21 should substantially indicate equal temperatures. However, when the switch 34 is closed current flows from the positive terminal of battery 32, through conductor 31, through ammeter 30, through conductor 29 to point 27 of the detector. The current then passes through the first member from the second end thereof toward the first end in a direction opposite to the heat flow through this element. The current then flows through base member 9 and through second member 4 substantially in the same direction as heat flow through this member. The current will pass from point 28 through conductor 35, through switch 34, through conductor 33 to the negative terminal of battery 32 to complete the circuit.

When current flows through the detector, because of the Thomson effect the temperature sensing means 20 and 21 will register different values of temperature. The relationship between the temperature measurements and the heat flow may be set forth in the following approximate relationship:

$$T = \frac{CIQL^2}{4.18 K^2 A^2}$$

Where:

C is the Thomson coefficient of the material of detector 2;
T is the temperature difference between the temperatures measured by the temperature sensing means 20 and 21 and also by suitably calibrated ammeter 44;
I is the current passing through the detector measured by ammeter 30;
Q is the heat flow;
L is the distance from the temperature sensing means in either member to the nearest surface of base member 9;
K is the thermal conductivity of the material; and
A is the cross-sectional area of either the first or second member (the distance L and the cross-sectional area A in the disclosed embodiment is the same for both members).

To best use this construction it is preferable that certain materials such as germanium and bismuth telluride be utilized in fabricating the detector, these materials having high Thomson coefficients.

For germanium with a current of .1 ampere and a heat flow of 10 calories per second and a cross-sectional area of ½ cm.$^2$, the temperature difference is in the order of 4° C. and is a direct function of the heat flow. This temperature can usually be detected by a comparison circuit and by calculating the circuit unbalance there is determined a direct measurement of heat flow.

FIGURE 2 illustrates a suitable comparison circuit which will permit the direct reading of heat flow. The temperature sensing means 20 and 21 in FIGURE 1 may be suitable thermocouple elements which generate current in response and in proportion to temperature. One set of conductors from these thermocouples may be connected to each other by means of the conductor 41 and the second set of leads may be connected by means of the conductor 42, ammeter 44 and conductor 43. If desired, a suitable variable resistance 40 may be connected in parallel with the thermocouple 20. This may be provided so that initially the readings on the ammeter 44 may be adjusted prior to the closing of switch 34 in FIGURE 1. Upon closing of the switch 34 in FIGURE 1 the ammeter 44 which may be suitably calibrated to read in calories per second or B.t.u. per hour will indicate heat flow as reflected by the unequal currents generated by thermocouples 20 and 21 in response to the unequal heating of these elements due to the Thomson effect occurring in detector 2.

In FIGURE 3 there is shown a second embodiment of detector 2 illustrated in FIGURE 1. This detector 2' comprises first and second members 3' and 4' having the second ends thereof including the cooling fins, thermocouple location points and circuit connecting points substantially the same as illustrated in FIGURE 1. However, in this embodiment detector 2' comprises not an integral construction but rather a three element construction wherein first member 3' and second member 4' are constructed of a material having a high Thomson coefficient. Recognizing that the function of base member 9' is merely to provide a circuit closing means in this embodiment the base member may be fabricated of a suitable conducting element such as copper. Surface 10' of the detector should have a suitable oxide coating to electrically insulate the detector from the object whose heat flow is being measured. First ends 5' and 6' are therefore not connected to the heat source but rather to the surface of base member 9' and may be suitably fastened thereto by means not shown.

FIGURE 4 illustrates a third embodiment of the detector illustrated in FIGURE 1. This construction is similar to that shown in FIGURE 3, however, detector 2'' has the first ends of the first and second members 3'' and 4'' abutting directly against the object 11 and the base member 9'' has its end portions 50 and 51 abutting against the sides of the first and second members in a manner to permit current to pass from the first to the second member. However, this base member is spaced from the object 11. Also a suitable metal object 52 may be provided to supply a heat flow path through the detector 2'' instead of cooling fins. Because of the location of the object 52, connections 27 and 28 are located on the side of the second ends of members 3'' and 4''.

In operation the embodiments shown in FIGURES 3 and 4 function in a manner similar to that of the embodiment described in FIGURE 1. However, rather than utilizing an integral construction the first and second members are connected by a suitable conductor which may be directly interposed between the first and second members or between the first and second members and the heat source.

It will also be appreciated that the detector may take equivalent forms and that current may be passed through equivalent first and second members by individual circuits provided for each member rather than having a single circuit including both members. The invention provides a construction permitting direct application of the device to a heat source and permits the direct reading of heat flow from the source without any calculations as is necessary by methods previously utilized.

While I have described preferred embodiments of my invention, it will be understood that my invention is not limited thereto since it may be otherwise embodied within the scope of the appended claims.

What I claim as new and desire to secure by Letters Patent of the United States is:

1. In a heat flow measuring apparatus, the combination of means defining a pair of heat conductive paths, a measuring circuit comprising a current sensing means and a pair of operatively connected temperature sensing means thermally coupled to said respective paths, means connected to said paths and adapted to be connected to a heat source to be measured, and means for passing a unidirectional current in opposite directions through said paths whereby the directions of heat flow and current flow in one heat path are the same and the directions of heat flow and current flow in the other are opposite.

2. The heat flow measuring apparatus according to claim 1 in which the first and second heat paths are fabricated from a material having a high Thomson coefficient.

3. In a heat rate measuring apparatus, the combination of first and second members fabricated of a material having a high Thomson coefficient, each of said members having first and second ends, the first end of each of the members being adapted to be placed adjacent a heat source to be measured, a measuring circuit comprising a current sensing means and temperature sensing means thermally coupled to each member, the second end of each member being adapted to be connected across a source of unidirectional current, and means connecting the areas adjacent the first ends of said members whereby an electrical circuit is completed upon the connection of the second ends to a source of unidirectional current.

4. The apparatus according to claim 3 in which the members and the means connecting the members comprise a unitary member fabricated from a material having a high Thomson coefficient.

5. In a direct reading heat rate measuring apparatus, the combination of a first member, a second member, said first and second members being fabricated from a material having a high Thomson coefficient, each of said members having a first end and a second end, the first end of each member being adapted to be placed adjacent a heat source to be measured, means for connecting the first ends of the first and second members, heat rate measuring circuit comprising means for sensing the temperature of the first and second members, and a source of unidirectional current connected across the second ends of the first and second members whereby heat flow through the first member is in the same direction as current flow and in the second member current flow is in an opposite direction from heat flow.

6. The apparatus according to claim 5 wherein each temperature sensing means includes a thermocouple, said thermocouples being connected in parallel and having connected therewith current sensing means adapted to sense the difference in current generated by each thermocouple, said current sensing means being calibrated to indicate directly heat rate from the heat source.

References Cited in the file of this patent

UNITED STATES PATENTS

| | | |
|---|---|---|
| 2,800,793 | Oliver | July 30, 1957 |
| 2,921,973 | Heikes | Jan. 19, 1960 |

OTHER REFERENCES

Temperature, Its Measurement and Control in Science and Industry. American Institute of Physics. Reinhold Publishing Corp., 1941.